Patented May 27, 1924.

1,495,624

UNITED STATES PATENT OFFICE.

WALTER A. WEST, OF ELKHORN, WISCONSIN.

LIQUEFIED COCOA AND PROCESS OF MAKING SAME.

No Drawing. Application filed January 5, 1922. Serial No. 527,150.

*To all whom it may concern:*

Be it known that I, WALTER A. WEST, a citizen of the United States, and a resident of Elkhorn, in the county of Walworth and the State of Wisconsin, have invented certain new and useful Improvements in Liquefied Cocoa and Processes of Making Same, of which the following is a specification.

The purpose of this invention is to produce a new food product of which the basis is cocoa and of which the characteristic is the complete liquefaction of the ultimate minute granules or cells of the cocoa which are dissolved apart, but are not individually dissolved or liquefied in any ordinary dissolving or cooking process. It consists of the steps of process, and of the mixture of elements hereinafter described, as indicated in the claims.

Heretofore, so far as I am aware, all processes of preparing cocoa for food or beverage have been such as to merely dissolve apart, or separate from each other, the minute granules or cells of which the cocoa is constituted, so that the liquid resulting is in fact only a mixture of aqueous liquid element, employed, with the minute granules or cells of cocoa held in suspense in the liquid, and not individually dissolved, or not themselves liquefied. All these previous food products may be recognized as being constituted as described, by the fact that, under favorable circumstances, minute sediment of the cocoa will be deposited.

I have ascertained that complete or actual liquefaction of cocoa can be effected by exposing it to an adequately high temperature under circumstances preventing it from burning; which involves having it in an aqueous solution and not a dry powder or mere thick paste, and then homogenizing the same. The exposure to the high temperature under these circumstances causes the melting of the contents of the minute cells or granules of cocoa, and this being followed by the homogenizing which mechanically bursts the cells, freeing the melted liquid contents, the liquefaction is complete and permanent, and the character as a food product, both as to taste and capacity for mixture with other elements in confection and bakery processes, and in respect to liability or the absence of liability to fermentation, souring or putrefaction, is very essentially different from the character of the cocoa which has not been treated for liquefaction or melting of its ultimate granules or cells and homogenizing.

In preparing cocoa according to this invention, the pulverized, or otherwise mechanically reduced cocoa, is mixed with water, producing an ordinary liquid cocoa mixture. This mixture is then heated to a temperatue approximately 200° F—below the boiling point. It is then run through the homogenizer, and upon discharge from the homogenizer, it is enclosed in hermetically sealed cans. These cans are then exposed to a temperature of approximately 250° F., which ensures complete disintegration of the cells and sterilization in a period of time usually not exceeding 30 minutes, the time required being long enough simply to cause each particle to actually acquire throughout the temperature indicated. The result of the entire process is that the granules or cells are melted or completely disintegrated, and that there is no longer a cellular structure, but a completely amorphous liquid, in which there is no tendency for the liquefied cocoa to separate from the water; but, on the contrary, the entire mixture is homogenous and permanent. And the sterilization being effected as described, this mixture may be kept almost indefinitely in unsealed containers, without deterioration except by evaporation.

For making a desirable food product, suitable for beverage, any desired amount of sugar may be added to the original mixture before heating, judgment being used to avoid making the liquid so rich with sugar as to cause it to set or become candied when cold. I have found a suitable proportion of sugar to be about two pounds to a gallon of liquid mixture.

I claim:—

1. The process of liquefying cocoa which consists in the following steps: first, thoroughly mixing pulverized cocoa with water, and raising it to a temperature approximating, but below the boiling point; second, homogenizing the mixture; third, subjecting the mixture in a closed vessel under restraint for pressure to a temperature enough above the boiling point for sterilization.

2. A food product consisting of a homogenized permanently sterilized mixture of water, a sweetening substance, and cocoa liquefied as to its ultimate cells or granules.

In testimony whereof, I have hereunto set my hand at Chicago, Illinois, this 30th day of December, 1921.

WALTER A. WEST.